US011159615B2

(12) United States Patent
Baldwin et al.

(10) Patent No.: US 11,159,615 B2
(45) Date of Patent: Oct. 26, 2021

(54) REPLICATION OPTIMIZATION FOR OBJECT STORAGE ENVIRONMENTS

(71) Applicant: International Business Machines Corporation, Armonk, NY (US)

(72) Inventors: Duane M. Baldwin, Mantorville, MN (US); Sasikanth Eda, Pune (IN); Sandeep R. Patil, Pune (IN); Gandhi Sivakumar, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 1103 days.

(21) Appl. No.: 15/207,565

(22) Filed: Jul. 12, 2016

(65) Prior Publication Data

US 2018/0020050 A1 Jan. 18, 2018

(51) Int. Cl.
*H04L 29/08* (2006.01)
*G06F 16/27* (2019.01)

(52) U.S. Cl.
CPC ........ *H04L 67/1095* (2013.01); *G06F 16/275* (2019.01); *H04L 67/1097* (2013.01)

(58) Field of Classification Search
CPC ............ H04L 67/1095; H04L 67/1097; G06F 16/275
See application file for complete search history.

(56) References Cited

U.S. PATENT DOCUMENTS

| | | | |
|---|---|---|---|
| 8,341,118 B2 | 12/2012 | Drobychev et al. | |
| 8,433,681 B2 | 4/2013 | Patel et al. | |
| 2006/0101422 A1* | 5/2006 | Bourges-Waldegg | G06F 9/548 717/136 |
| 2006/0236083 A1* | 10/2006 | Fritsch | G06F 8/65 713/1 |
| 2010/0274762 A1 | 10/2010 | Murphy et al. | |
| 2012/0166394 A1 | 6/2012 | Kim et al. | |
| 2014/0082301 A1 | 3/2014 | Barton et al. | |
| 2014/0189004 A1* | 7/2014 | Aahlad | H04L 67/1048 709/204 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Charles D Adams
(74) *Attorney, Agent, or Firm* — Nolan M. Lawrence

(57) ABSTRACT

A middleware at a proxy node may cause a copy of a data object stored on a storage node to be updated. Copies of the data object may be stored on a plurality of storage nodes located in first and second geographic locations. A first processing activity for a storage node that corresponds with the application category of the data object may be determined. A first storage node may be selected for a first update based on being associated with the first processing activity in a first proportion. The copy of the data object stored at the first storage node may be updated before updating a copy of the data object stored at a second storage node. The second storage node may be associated with the first processing activity in a second proportion, with the second proportion being less than the first proportion.

14 Claims, 7 Drawing Sheets

(56) References Cited

U.S. PATENT DOCUMENTS

| | | | | |
|---|---|---|---|---|
| 2015/0074672 A1* | 3/2015 | Yeddanapudi | .......... | G06F 9/544 |
| | | | | 718/103 |
| 2015/0244804 A1* | 8/2015 | Warfield | .............. | H04L 47/621 |
| | | | | 709/219 |
| 2016/0357806 A1* | 12/2016 | Andleman | .......... | G06F 16/2471 |

OTHER PUBLICATIONS

Rouse, M., "Business Process Management (BPM)," Tech Target, Jan. 3, 2011, 1 page. http://searchcio.techtarget.com/definition/business-process-management?

Rouse, M., "Erasure Coding," Tech Target, Nov. 17, 2014, 1 page. http://searchstorage.techtarget.com/definition/erasure-coding.

Spiegel, M., "Open-Sourcing Ssync: An Out-of-the-Box Distributed Rsync," Add This blog, Oct. 8, 2013, 3 pages. http://www.addthis.com/blog/2013/10/08/open-sourcing-ssync-an-out-of-the-box-distributed-rsync/#.VpgmcEbGpRp.

Unknown, "Business process management," Wikipedia, the free encyclopedia, 4 pages, (printed Jan. 14, 2016). https://en.wikipedia.org/w/index.php?title=Business_process_management&oldid=658886566.

Unknown, "Replication," Swift 2.51.dev259 documentation, openstack.org, 2 pages, (printed Jan. 14, 2016). http://docs.openstack.org/developer/swift/overview_replication.html.

Unknown, "rsync to multiple remote servers," StackExchange.com, Unix & Linux Questions, 1 page, (printed Jan. 14, 2016). http://unix.stackexchange.com/questions/175549/rsync-to-multiple-remote-servers.

* cited by examiner

REPLICATION OPTIMIZATION FOR OBJECT STORAGE ENVIRONMENTS

BACKGROUND

Aspects of the present disclosure relate to object replication within an object storage system; more particular aspects relate to determining an order for updating objects within an object storage system.

Object service storage systems allow for addressing and processing discrete units of data called data objects, or simply "objects." The object storage environment may store objects on object storage nodes. Objects may be stored within a storage pool, and may be accessed via a unique identifier (unique ID, or unique NAME) that allows an end user to retrieve the object. The object may be retrieved and read by the end user. A data object may store data processed or output by a computer program, or program code executable by a processor, e.g., a storlet or application code.

SUMMARY

Various embodiments are directed to a computer-implemented method for updating a copy of a data object stored on a storage node. The method may be performed by a processor executing a middleware at a proxy node. The method may be implemented in a context in which a plurality of copies of a data object are stored on a respective plurality of storage nodes. In addition, one or more storage nodes of the plurality of storage nodes are located at a first geographic location, and one or more different storage nodes of the plurality of storage nodes are located at one or more geographic locations different from the first geographic location. The method may include determining an application category for the data object. The method may also include determining a first processing activity that corresponds with the application category of the data object. In addition, the method may include selecting a first storage node of the plurality of storage nodes for updating a copy of the data object stored at the first storage node based on the first storage node being associated with the first processing activity in a first proportion. Further, the method may include updating the copy of the data object stored at the first storage node before updating a copy of the data object stored at a second storage node. Moreover, the second storage node may be associated with the first processing activity in a second proportion, where the second proportion is less than the first proportion.

Various embodiments are also directed to a system, and a computer program product for updating a copy of a data object stored on a storage node. The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
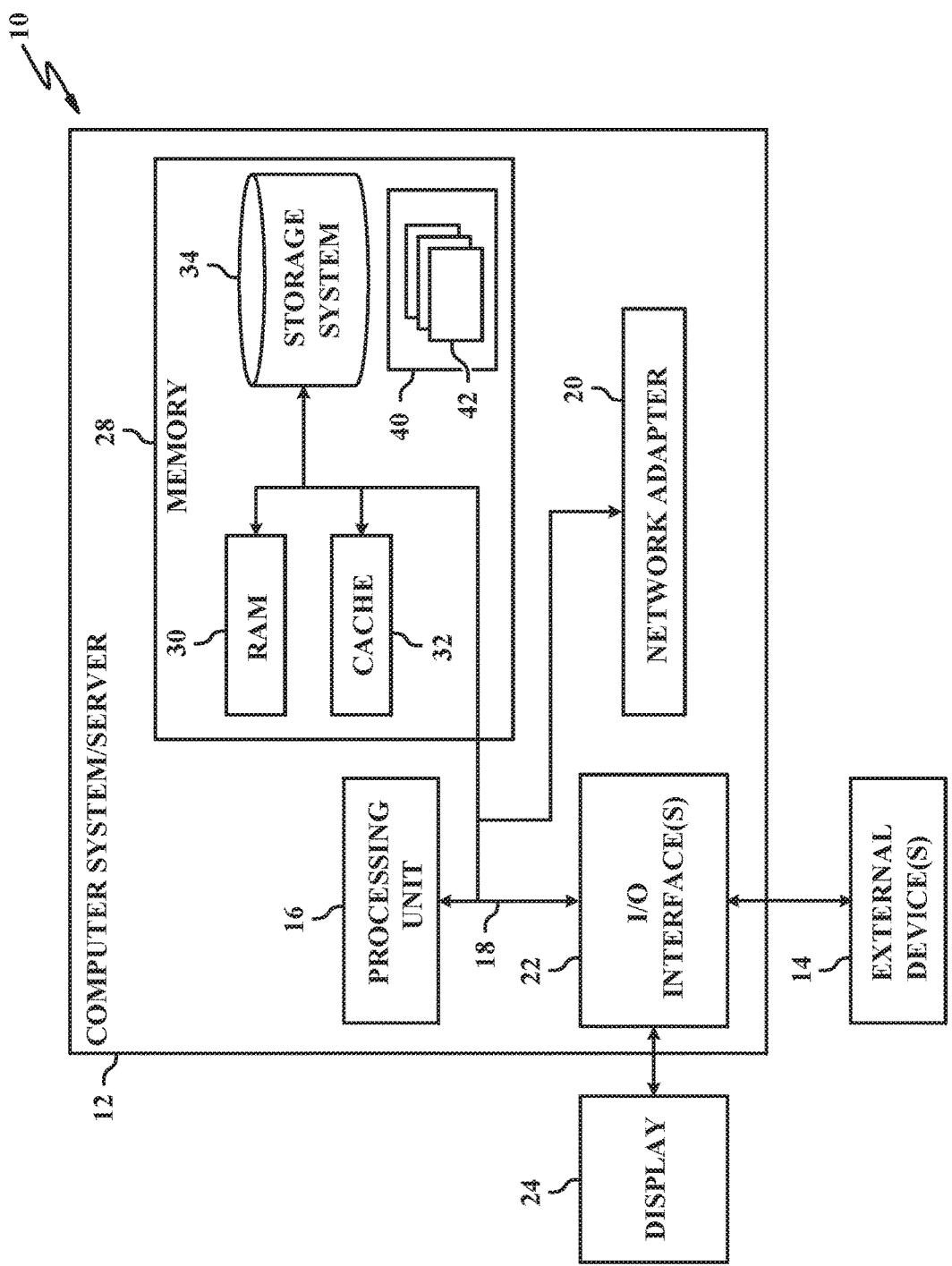
FIG. 1 depicts a cloud computing node, according to various embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to object storage, and more specifically, to determining an order for updating objects stored on one or more object storage nodes within an object storage system. The storage system may receive an object to be updated. An application category for the data object to be updated may be determined. A copy of the object may be stored on the one or more object storage nodes. The storage nodes may be located in two or more different geographic locations. In addition, processing activities for some or all of the storage nodes may be determined. A first storage node having a processing activity that corresponds with the application category of the data object may be determined. The object may be replicated and updated on the one or more object storage nodes in an order based on a priority scheme that considers the application category of the data object and processing activities of the storage nodes. The first storage node may be selected for a first update based on being associated with a processing activity that corresponds with the application category of the data object in a first proportion. The copy of the data object stored at the first storage node may be updated before updating a copy of the data object stored at a second storage node, which corresponds with the application category of the data object in a second proportion that is less than the first proportion. The second storage node may not be associated with the first processing activity (e.g., have a second proportion of 0%) or may be in a different geographic location than the first storage node. While the present disclosure is not necessarily limited to such applications, various aspects of the disclosure may be appreciated through a discussion of various examples using this context.

Replication in an object storage environment (e.g., object storage system) may use a push model, where records and files are copied from local to remote replicas using rsync/ssync or other copy tools. The push model may result in an update to the object storage of one or more object storage nodes of the object storage system. The object storage system may include a determined number of storage nodes or N-Zones (e.g., each zone corresponding to a geographic area). The object storage system may determine one or more destination sites within the object storage system and update each object stored on the destination sites with a new object (e.g., a new copy of a previous object). A replication daemon may identify the respective destination sites to which objects may be replicated, and the objects may be passed one-by-one to an rsync/ssync Linux tool to update each of the destinations. In an N-Zone environment, the optimized object is transferred one-by-one to the N number of remote machines in log N iterations.

Object storage replication associated with a traditional replication model may be unaware of the applications deployed and the inter dependency or workflow associations between components. This may result in a poor performance of the applications using object storage back-ends and may eventually result in application time-outs. For example, a document content management application may be deployed on object storage systems situated in the United States of America (USA) (Zone-A) and a new object may be subsequently uploaded to Zone-A. A replication of the document content management application may be needed as an input to review a staging application deployed at the object storage system situated at India (Zone-I). If the replicator does not consider this workflow association, the replicator might choose object storage systems deployed at Zone-I as the last replication site. By choosing Zone-I as the last site, the replication may delay the staging application, which might result in application time-out. By selecting replication zones based on the workflow or processing activity associated with the zone and the application category of the data object, the replication of the data object may be based on a priority scheme, which may result in more efficiently updated objects in an object storage system. The priority of an object storage system may be based on a system matching an application category of the object to be replicated with a processing activity of a storage node. If the data object to be replicated has an application category that matches a processing activity of a storage node, then the storage node may be updated first.

In various embodiments, the disclosure may incorporate a deployment scenario wherein a proxy node may connect to one or more object storage systems, each having one or more storage nodes, deployed across various geographies and applications (or application components) designated for that particular geography. The application may be deployed in order to support a workflow of an organization, with various processing activities or stages distributed geographically. For example, a document content management application of a Docket Management System (DMS) may be deployed on an object storage system in the USA, an image content management application may be deployed to an object storage system in Japan, and a staging application may be deployed to an object storage system in India.

Aspects of the present disclosure relate to various algorithms that may assist in optimizing a workflow of a storlet (e.g., an embedded computational unit within traditional object storage) as well as enhancing reliability and security by leveraging performance evaluation reports, certificated preferences, and past experience. A storlet is a computational unit that may be triggered by events (e.g., PUT or GET operations) on metadata attributes associated with an object. A storlet may be a computation module that may be dynamically uploaded (e.g., the storlet may be transferred to an object storage node from another node without interrupting a process currently executing). A storlet may include embedded computing infrastructure within an object storage environment. A storlet may also serve to offload data-intensive computations to the location of data storage, instead of transferring the data to be executed in a single location (e.g., a processing node). A storlet may run within a storage node (or storage medium) proximate to the location of stored data. A storlet may add flexibility to the object storage environment, and may make the storage extensible, effectively making the storage a platform, according to various embodiments. In other words, a storage system may be transformed, using a storlet, from a system that merely stores data to a system that produces results from the stored data.

Storlets may be loaded on an object storage node as an object. Storlets may be dynamically loadable code, which may bring the computation to the data. Storlets may bring computations to the data instead of moving the data to a processing unit (e.g., a compute node, server, or central processing unit (CPU)) to process the computation. Storlets may include traditional object storage architecture, storlet embedded object storage architecture, and/or performance reports. The storlet may analyze a deployed computational algorithm (e.g., processing operations) and determine an optimal storage node for processing (e.g., executing) the computational algorithm. Storlets may also reduce the amount of over the network transfers by processing the computational algorithms on the storage node. The implementation of the storlet is further described herein.

A storlet may be enabled by augmenting an object storage system with a storlet engine. The storlet engine may allow the object storage system to go from only storing data to being able to produce results from the data stored within the object storage nodes by utilizing a storlet within a middleware within the object storage node. The middleware may be a service, system, and/or application for connecting one or more nodes or applications within the object storage environment. The storlet engine may provide the capability for a storlet to run on the object storage system. In various embodiments, the storlet may be run within a secure sandbox to insulate the storlet from the rest of the system and/or other storlets. The secure sandbox may be a mechanism for separating programs running within a same system, by providing a tightly controlled set of resources to the storlet. The secure sandbox may block undesirable actions from the storlet (e.g., directly accessing cloud storage or communicating outside of the machine). The sandbox may also limit access to local file systems or local ports within the object storage system.

The storlet engine architecture may include an extension service. The extension service may connect to an object storage and may determine if a storlet should be initiated. Upon a determination that a storlet may be initiated, the execution service may determine the optimal storlet, and may securely initiate the storlet. The execution service may be positioned in strategic locations within the object storage system to determine if a request for an object matches an information field of one or more predefined rules of a storlet. If a request for an information field matches a predefined rule of a storlet, then the storlet may be executed through the execution service.

A storlet engine may support a plurality of execution services in a plurality of storlet programming languages. A storlet engine may also be located in a storage interface node (e.g., a proxy node) or within a storage local node (e.g., storage node). An example object storage architecture may utilize two types of nodes (also referred to as entities). A "proxy" node may be used for distributed load handling, where the proxy node may distribute objects to one or more storage nodes within an object storage environment. The proxy node may also handle requests of the storage nodes into a namespace. Another node type may be called a "storage" node, which may write to the various storage subsystems (e.g., disks).

The storage nodes may serve as storage units or repositories, and may provide data for an analysis of computational algorithms by providing information from raw data residing in storage subsystems. Typically, a storage node architecture would utilize an additional client or node in order to compute data. A storlet enabled proxy node may provide access to one or more object storage systems within the object storage environment. In various embodiments, a storlet engine may be positioned within the storage node if the execution of the computational algorithm requires an increased amount of data-processing storlets. In various embodiments, storlet engines may be positioned within a proxy node if the execution requires an increased amount of compute intensive (e.g., resource intensive) storlets. Compute intensive storlets may be storlets that access several objects within different object storage nodes. A storlet engine may run one or more storlets, according to various embodiments, and may operate along with various software (e.g., middleware). In order to combat various inefficiencies, a storlet engine may be utilized in an object storage environment, and the storlet engine may utilize one or more storlets.

Object service storage environments may allow for addressing and processing discrete units of data called objects. Each object may be identified with its own unique identification (unique ID or unique NAME) and may be self-contained. The unique ID (or unique NAME) may be a pointer, which may relate to a specific object within a storage pool. The storage pool may store one or more data objects for processing. A computational algorithm may request a data object within an object storage node. For example, the storage pool may be a collection of object storage nodes connected to a proxy node. For the computational algorithm to be executed, the computational algorithm may require an object stored on one of the storage nodes connected to the proxy node. The computational algorithm may be distributed from the proxy node to the storage node containing the object. The storlet of the storage node may execute the computational algorithm. The results of the executed computational algorithm may then be returned to the user.

The architecture of a storlet may include a software engine within various nodes of an object storage environment (e.g., a multi-node object storage environment). An end user may frame the computational algorithm and deploy or pass the computational algorithm to the storlet as an object storage request (e.g., "PUT") operation. A storlet-configured object storage system may not require any additional clients or compute nodes to perform analyze the data, thus storage nodes or proxy nodes may act as compute nodes and may return results to the user. Various architectures may use virtual machines (VMs), but the architectures may additionally, or alternatively, use Linux containers, Dockers, etc., deployed on the nodes in order to perform various computation tasks or operations. A storlet may be composed of or utilize Linux containers and/or additional middleware.

Storlets may be viewed as an analog to accessing procedures stored in one or more databases. A storlet environment may include a scheduler algorithm/framework to enhance security, user trust, improve computation performance, and/or reduce workload on the storage node in a multi-vendor commodity object storage environment. For example, a storlet environment may enhance security by running the storlet within a Virtual Machine (VM). A storlet operating within the VM may not access the object storage or not allow computational algorithms to access an object storage node without first being assigned to the object storage node. A storlet scheduler operation or framework may improve computation performance and may reduce workload on a storage node in a multi-node object storage environment by performing specific workflow changes in the embedded compute engine. This may help in automatic storlet invocation, which may include selecting a node for computation operation execution, according to a classification of computation operations designated for a particular system.

Object storage systems (both traditional object storage and embedded compute engines within object storage systems) may be built using commodity or multi-vendor hardware. Each node may be treated equally, irrespective of its role. The use of commodity hardware for traditional object storage systems may be practical as the object storage may be primarily designed to be low cost storage, but commodity and multi-vendor hardware may generate suboptimal results when used for compute embedded object storage systems.

A storlet scheduler operation or framework may improve computation performance or may reduce workload on the storage node in a multi-vendor (or commodity) object storage environment by performing specific workflow changes in the embedded compute engine (storlet). Workflow changes may be made according to various hardware architecture values or characteristics. Hardware characteristics may be designated by the hardware manufacturer, or may be received from any other source, including various repositories on the Internet and elsewhere.

A framework and middleware may help provide sufficient (e.g., the best node for the update) storlet invocation. Invocation of a storlet may include picking a node for a computation operation execution according to the classification of computation operations assigned for a particular system. The appropriate node may be determined based on the availability of resources.

A storlet engine may support two modes of operation: a synchronous mode and an asynchronous mode. The synchronous mode allows the storlet to run within a hypertext transfer protocol (HTTP) request/response that initiated an execution of a computational algorithm. The HTTP request completes after the storlet finishes executing. The asynchronous mode causes the HTTP request that initiated the storlet execution to end when the system registers that the request has reached a queue. The storlet may then run in the background, which may result in an accumulation of results within a queue as the storlet, in asynchronous mode, executes requests in the background. For example, a storlet, running in asynchronous mode, may receive computational algorithms as a request. The storlet may receive the request, acknowledge the receipt of the request, and then process the request. Without having to send a result to complete the execution, the storlet may build a queue, and the storlet may control a queue of computational algorithms to be executed. An output of an object storage node may also include information about its completion status. The storlet initiator may then access an output of an object and retrieve the results of the computation.

Objects stored on object storage may include an object ID (OID), object NAME, and metadata/attributes of the object. Once an object is created on a first node, it may be copied to one or more additional nodes, depending on the policies of the object storage environment. Depending on the object storage environment, the nodes may provide redundancy and high availability (HA), and may be located within a same data center or may be geographically dispersed.

In a public cloud computing environment, object storage may be accessed over the Internet through a Representational State Transfer (REST) Application Programming Interface (API) (i.e., REST API) over a HTTP. Public cloud service providers may provide APIs to an end user. In a private cloud environment, end users may either develop their own API or use an object storage device (OSD). In general, commands sent over HTTP to object storage may include: "PUT" to create an object, "GET" to read an object, "DELETE" to delete to purge an object and list-to-list objects.

The storlet engine may include operations associated with, or perform operations on behalf of, a Business Process Management (BPM) system, application, or workflow. A BPM system is one example of a software application that may have various processing activities. A BPM system generally refers to a software application used for organization and monitoring of a business process or workflow. The processing activities of a BPM workflow may involve multiple complex components (e.g., object storage nodes) which may be distributed across various geographies (or zones). The storage nodes may perform one or more functions such as input collection, modelling, approvals, simulations, etc. The object storage systems may be configured to include BPM workflow components, which may include erasure coding, embedded computation, and/or middleware storlets. This disclosure includes three variations of configurations of object storage systems. Object storage systems may not be limited to these three variations and are only provided as examples further herein.

A BPM application may be used to model a particular business process, such as a financial, insurance, governmental, retail, or engineering process. A BPM application may be associated with a Business Process diagram (BPD), which is a graphical representation for specifying a model of a business process. A BPD may include processing activities or operations, and connections between the activities. Activities may by performed by a human, a machine, or a human using a machine. Some activities can only be performed after another activity has been completed. The connections in a BPD can show these dependencies.

As one simplified example, a BPM application can model a home loan process, tracking the process from receipt of an application to funding the loan. In a first processing activity (or operation), a loan application is received. The loan application may be checked for correctness in a second processing activity. In a third processing activity, a credit report and a credit score are obtained. Various items on the credit report may be checked for correctness in a fourth processing activity. A credit report is obtained from a credit bureau and it may be necessary to follow up with the applicant or a particular creditor listed on the report in the fourth processing activity. In a fifth processing activity, a decision is made on the loan. The loan decision may be reviewed or approved in a sixth processing activity. If the loan is denied, a seventh processing activity may include notifying the applicant and providing a legally required notice to the applicant. If the loan is approved, an eighth processing activity includes preparing loan documents. In a ninth processing activity, documents are signed and recorded, and the loan is funded.

The various processing activities can be performed or initiated by different persons using different computers. In addition, some activities may be automatically initiated or performed by different computers. In various embodiments, a storlet running on a storage node may be employed to perform any of the various processing activities of a BPM system. For example, verifying the correctness of a loan application or a credit report could be performed by a storlet running on a storage node. A storlet performing a processing activity of a BPM system may be associated with a particular processing activity (or the node on which the storlet runs is associated with a particular processing activity). Continuing the example, a first storlet (or storage node) may be associated with a processing activity called loan application verifying. A second storlet (or storage node) may be associated with a processing activity called credit report verifying. Moreover, a storlet or a storage node may be associated with a processing activity to varying proportions.

The individuals, computer systems running BPM application components, and storage nodes running storlets performing processing activities may be distributed among two or more different geographic locations, which may be in two or more different time zones. Moreover, a BPM workflow may involve multiple processing activities distributed across various geographic locations. For example, processing activities, such as following up on a credit report issue, making a loan decision, and reviewing the loan decision may each be performed in a different geographic location using storage nodes local to each geographic location.

While processing activities and storage nodes may be distributed across different geographic locations, the respective processing activities of a BPM system generally need to be able to access the same application functions and the same data. For this reason, a copy of the application and a copy of a particular data object may be stored at various storage nodes distributed across different geographic locations. This may permit any processing activity to be performed at any storage node. A relatively large proportion of a particular processing activity may be performed at a first storage node. On the other hand, a relatively small proportion of the particular processing activity may performed at a second storage node. The proportion of processing activity may be expressed as a percentage of the processing activity system wide. In a various embodiments, proportions of a particular processing activity performed at various node may be determined. The proportions may be determined with respect to any suitable time frame. For example, a proportion of a particular processing activity performed at a first storage node in the course of a year may be determined. As another example, a proportion of a particular processing activity performed at a first storage node in the past minute may be determined. As yet another example, a proportion of a particular processing activity performed at a first storage node in a particular time interval, e.g., between 10 AM and 11 AM over a 1, 5, or 30 day period, may be determined.

As can be seen from the above home loan example, certain activities cannot be completed until other activities or operations are completed. For example, a credit report cannot be requested until an application is checked for correctness, or a loan decision may not be approved until a loan decision is made. Dependencies in a BPM process may be manually determined, such as from analysis of a BPD. Manually determined activity dependencies may be stored in a machine readable file associated with a BPM system. Alternatively, a BPM system may include a component for automatically determining activity dependencies. According to various embodiments, a first storage node may be a provided with an updated copy of a data object before a second node when it is determined that the first storage node is associated with a first processing activity, the second storage node is associated second processing activity, and the second processing activity depends on the first processing activity (e.g., is performed after completion of the first processing activity).

The object storage system may communicate with a proxy node including a middleware. The object storage nodes of the object storage system may be non-erasure coded, non-compute embedded/non-storlet (e.g., a storage node not including a storlet). The middleware of the proxy node may classify a category of an incoming "new" data object (or update to an old data object) according to configured application components of the object storage system. The middleware may identify if the incoming new data object is used by an application component of one or more storage nodes of the object storage system. For example, the application component may be configured as a storage node within the object storage system; the storage node may be local or remote to the particular zone. The middleware may then determine one or more storage nodes that require the new data object and their corresponding replication geographies (or zones). The middleware may then provide a software framework to the identified replication zones. The software framework may alter a default replication process, such that the replication zones, which require the new object, may be selected based on a priority for replication. In various embodiments, the middleware may classify the incoming new data object according to the configured application component. The application component may be configured as local or remote to the particular zone. The middleware may then estimate remote application components which require the new data object and their corresponding replication zones. The middleware may then provide the identified zones a software framework, which alters the replication process such that the zones, which require the object, are selected as priority for replication, e.g., the data object may be updated at a storage node in a first geographic zone before the object is updated at a storage node in a second geographic node that is different than the first geographic zone.

The object storage system may communicate with a proxy node including a middleware. The object storage nodes of the object storage system may be non-erasure coded, compute embedded/storlet (e.g., the storage nodes each including a storlet). The middleware of the proxy node may classify a category of an incoming "new" object (or update to an old object) according to configured application components of the object storage system. The middleware may identify the incoming new data object as being used by an application component (or application). The application component may be configured to use a particular storage node within the object storage system, which may be local or remote to the particular zone. The middleware may then determine one or more storage nodes that require the new data object and their corresponding replication geographies (or zones). The middleware may then provide a software framework, which may invoke a storlet engine of the one or more object storage systems in the respective zones, to support an "object pull" based replication model. The object pull replication model may invoke the storlets of the object storage nodes to pull the object from the proxy node, based on priority.

The object storage system may communicate with the proxy node including a middleware. The object storage nodes of the object storage system may be an erasure coded, compute embedded/storlet (e.g., each storage node being erasure coded and including a storlet). Erasure coding may protect data stored on the object storage node. The data may be broken into fragments, expanded, encoded with redundant data pieces, and stored across a set of different locations or storage media. The object storage system may include a software framework and an algorithm, which may assist in facilitating an optimized replication methodology for a distributed BPM application deployed within storlet-enabled object storage storlet systems (or environments). The object storage system may leverage previous BPM workflows of the storage nodes within the object storage system to determine the processing activities associated with the object storage nodes. The middleware may classify an incoming "new" data object (or update to an old data object) according to a configured application components. The middleware may identify if the incoming new data object is used by an application component (or application). The application component may be configured to use a particular storage node within the object storage system, which may be local or remote to the particular a geography (or zone). The middleware may then determine one or more storage nodes that require the new data object and their corresponding replication zones. The middleware may then provide a software framework, which may invoke a storlet engine of the one or more object storage systems in the respective zones, to support an "object pull" based replication model. The object pull replication model may invoke the storlets of the object storage nodes to pull the object from the proxy node, based on a priority. In various embodiments, the storlet engine may form a map relationship between the object and the corresponding erasure-coded bits. A map relationship of the erasure-coded bits may cause a path from a first bit to a next bit to read slower, and does not support multi-processing.

Various embodiments may be implemented in a cloud computing environment, which is described below with respect to FIGS. 1, 2, and 3.

Figure 4:
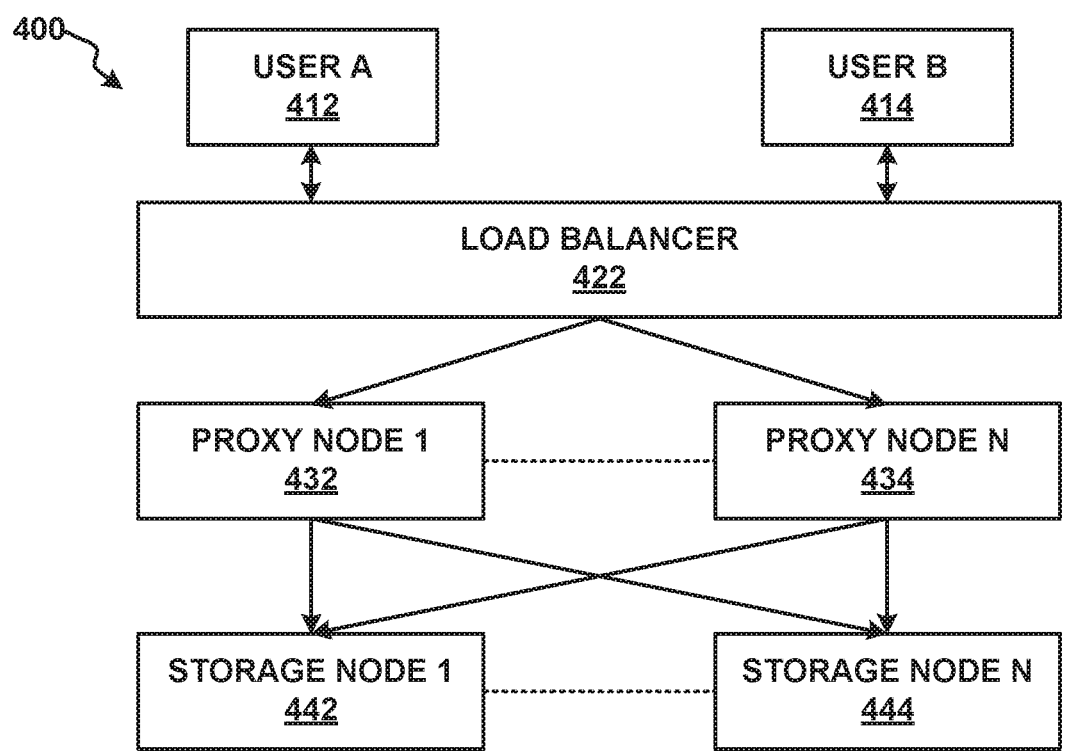
FIG. 4 depicts an object storage architecture, according to various embodiments of the present disclosure.

FIG. 4 depicts an embedded compute engine 400 based on subject storage architecture. The embedded compute engine 400 may be one or more program modules 42 (of FIG. 1) running on one or more computer system/servers 12 (of FIG. 1). The embedded compute engine 400 may be accessed by one or more users, including, for example, a first user 412, and a second user 414. The first user 412 and the second user 414 may connect to a load balancer 422. The load balancer 422 may connect to one or more proxy nodes illustrated as a first proxy node (PROXY NODE 1 432) and one or more proxy nodes as an $N^{th}$ proxy node (PROXY NODE N 434). The one or more proxy nodes, including the first proxy node 432 and the $N^{th}$ proxy node 434, may connect to one or more storage nodes. The connection between the proxy nodes and the storage nodes may include a connection to a first storage node (STORAGE NODE 1 442), and one or more storage nodes as an $N^{th}$ storage node (STORAGE NODE N 444). In various embodiments, each proxy node may be configured to connect to each of the one or more storage nodes. In various embodiments, each proxy node may connect to only a select set of the one or more storage nodes.

In various embodiments, a load balancer may connect directly to a storage node. Instead of the proxy node receiving a computational algorithm (e.g., processing operations to be performed on an object) from the load balancer and distributing the computational algorithm to a storage node, the load balancer may distribute the computational algorithm directly to a storage node. By directly connecting to the storage node, the load balancer may interact with the storage node in the same manner as the load balancer would with a proxy node.

An object storage architecture may include two entities/node groups. A first node group may be called "proxy nodes" (e.g., the first proxy node 432), which are used for a distributed load/request handling nodes in to the namespace. A second node group may be called "storage nodes" (e.g., the first storage node 442) which may be responsible for writing to the disks/storage subsystems and may serve as a storage node/unit/repository for analysis (extracting meaningful information from raw data). By equipping a storage/proxy node with a storlet, the storage/proxy node may analyze the data objects residing within the node, whereas other applications of the object storage architecture may require an additional client or compute node for processing the objects outside a storage/proxy node.

A first user 412 may connect to the load balancer 422 and submit a computational algorithm to the load balancer. The computational algorithm submitted by the first user may be distributed to a proxy node 432 of the one or more proxy nodes. In an example, the load balancer may connect to a first proxy node. The computational algorithm may be received by the proxy node 432 and either executed on the proxy node or distributed to a storage node. The proxy node may then connect to one or more storage nodes and distribute the computational algorithm to a preferred first storage node 442 for the processing of the computational algorithm. In the example, the first proxy node may connect to a first storage node. The storage node 442 may then process the computational algorithm, and send a result of the computational algorithm back to the first user through the first proxy node and load balancer.

Figure 5:
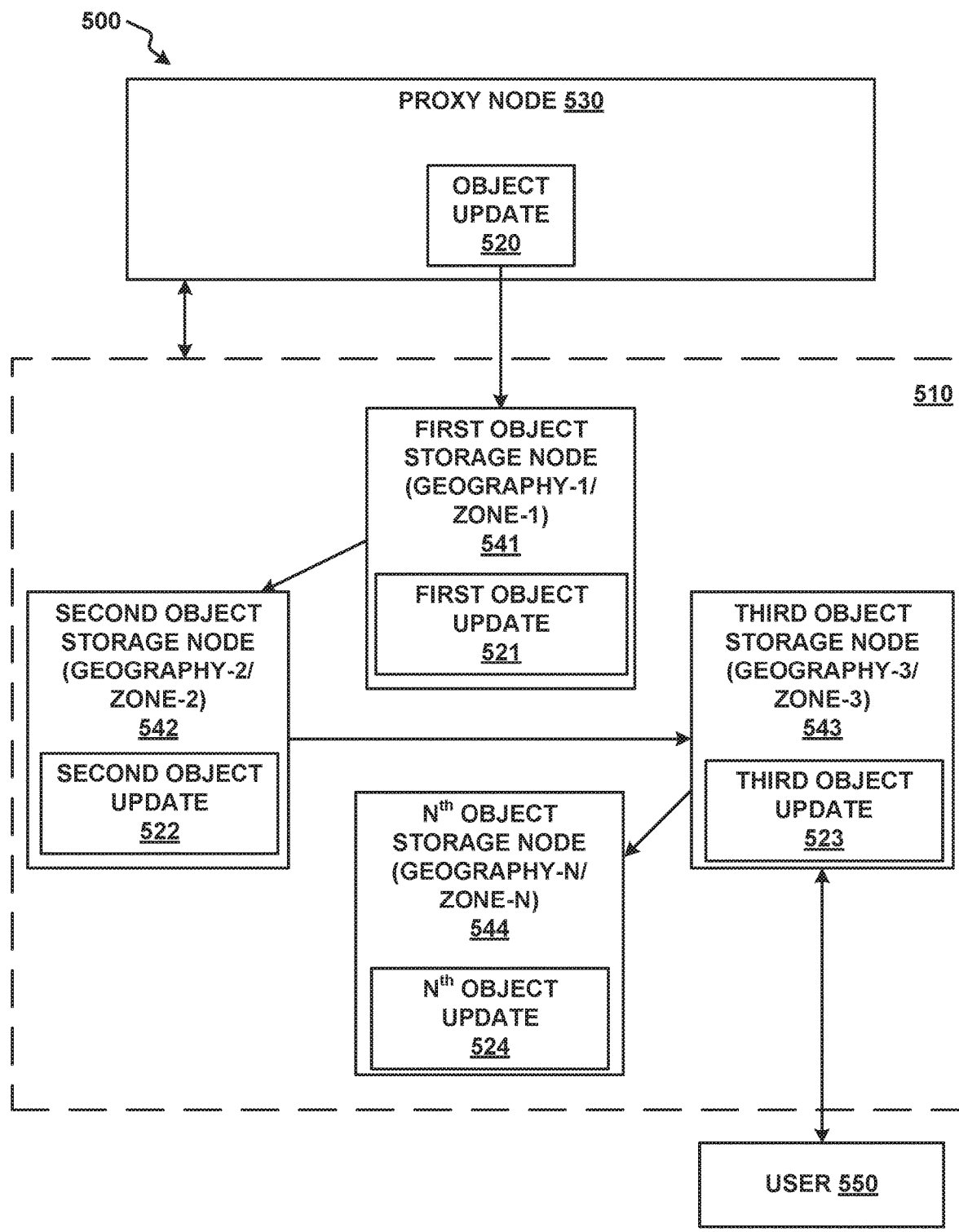
FIG. 5 depicts an object storage environment updating an object on one or more storage nodes according to a proximity or workload priority scheme, according to various embodiments of the present disclosure.

FIG. 5 depicts an object storage environment 500 for updating an object on one or more storage nodes according to a proximity or workload priority scheme, in accordance with embodiments of the present disclosure. In some embodiments, the proximity or workload priority scheme may be, for example, a default order for updating storage nodes. The object storage environment 500 may include a first proxy node 530, which may receive an update to an object 520 (or new object) to be replicated (e.g., updated) on an object storage system 510. In various embodiments, the proxy node 530 may also reside within the object storage system 510. The proxy node 530 and the object storage system 510 may be one or more instances of computer system/servers 12 (of FIG. 1). The object update 520 may be sent from the proxy node 530 to one or more object storage nodes 541-544 of the object storage system 510.

The object storage system 510 may include one or more object storage nodes 541-544. The one or more object storage nodes may include a first object storage node 541, a second object storage node 542, a third object storage node 543, and one or more additional object storage nodes as an $N^{th}$ object storage node 544. The first object storage node may be located in a first geography/zone (geography-1/zone-1). The second object storage node 542 may be located in a second geography/zone (geography-2/zone-2). The third object storage node 543 may be located in a third geography/zone (geography-3/zone-3). The $N^{th}$ object storage node 544 having one or more additional object storage nodes as the $N^{th}$ object storage node 544 located in one or more additional geographies/zones as the $N^{th}$ geography/zone (geography-N/zone-N). In an example, the $N^{th}$ object storage node 544 may include eight additional object storage nodes each with their own geographies/zones.

An update to an object 520 may be received by the proxy node 530. Copies of the data object 520 may be updated based on one or more factors. For example, a factor may include determining a first update of a storage node based on the proximity of the storage nodes to the proxy node. If a first object storage node is the closest in proximity to the proxy node, then the first object storage node may be the first to receive the update. Proximity may be based on geographic distance or a network distance. For example, a communication channel with a large bandwidth and low latency between the proxy node and a particular storage node may make the particular storage node more proximate, e.g., closer, than another storage node that is geographically closer to the proxy node, but which is coupled to the proxy node via a low bandwidth and high latency communication channel. In an additional example, a determination may be made as to which nodes have the lowest workload. If a first object storage node has one of the lowest workloads compared to the other storage nodes, then the first object storage node may be the first to receive the update.

Each object storage node (e.g., the first object storage node 541) may include data objects stored therein. When an update to an object stored within the one or more object storage nodes 541-544 of the object storage system 510 is received by the proxy node 530, the proxy node may distribute the data object to the first object storage node 541 performing a first object update 521. The first object storage node 541 may then send the update to the second object storage node 542 performing a second object update 522. The second object storage node 542 may then send the update to the third object storage node 543 performing a third object update 523. The third object storage node 543 may then send the update to the next object storage node of the remaining one or more object storage nodes illustrated as the $N^{th}$ object storage node 544 preforming one or more object updates as the $N^{th}$ object update 524.

A user 550 may attempt to access a particular data object stored on an object storage node of the object storage system 510. The user 550 may access the object through an operation (e.g., the user may perform an application transaction associated with a processing activity). The object may be hosted on the object storage system 510. If an object update 520 is underway for the particular data object of the object storage nodes 541-544 when the user is attempting to access a object storage node, then the application may time out (or provide poor results) when attempting to perform the application transaction. Illustrated for example in the object storage environment 500, the user 550 may access the third object storage node 543. The third object storage node may have a geography-3 (or zone-3) which may indicate a region of the Northwest United States, and the user may be positioned within the geographic region of the Northwest United States. The third object storage node 543 may not receive the object update 520 until after the object is firstly updated on the first object storage node 541 (e.g., the first object update 521) and secondly updated on the second object storage node 542 (e.g., the second object update 522). If the user submits the operation during the update, then the transaction may time out (or give poor results). For example, the third object storage node may not be able to process the transaction until the data object is updated when the object storage node receives an object update. If the third object storage node cannot perform the transaction, the transaction may timeout until the update is completed. In an additional example, the object may contain data pertinent to transactions. If the user sends a transaction to the third object node which is not yet updated, then the object may return non-updated data (i.e., data that is possibly incorrect) to the user. The non-updated data may result in poor (e.g., incorrect) transaction results.

In various embodiments, an object storage replication may be performed based on the HASH of the object. If a particular geography (or zone) is updated with a new object, the replication process during its regular (or scheduled)

interval may identify a HASH of the newly uploaded object and perform a comparison of the new object HASH with object HASHes pertaining to the object stored on other locations. If the HASH of the new object does not exist in the other sites, then a list of zones to which object needs to be replicated may be identified. The list of identified zones (e.g., remote object storage systems) may be sent to an rsync/ssync tool, wherein the object may be copied to remote zones one-by-one (e.g., at the first instance to Zone-A→Copy complete, second instance to Zone-B→copy complete, etc.).

In various embodiments, if a particular zone has received an update to an existing object, the replication process during its regular (or scheduled) interval may identify a most recent last modified time of the object, in comparison with last modified times of the object existing in other zones. After performing the last time modified operation, the replication process may determine which zone contains the most recently updated object. The replication process may also identify the HASH of the updated object, perform a comparison of the updated object HASH with object HASHes of other locations, and identify a list of zones to which the object needs to be replicated. The list of identified zones may be sent to an rsync/ssync tool, wherein the object may be copied to remote zones one-by-one.

Figure 6:
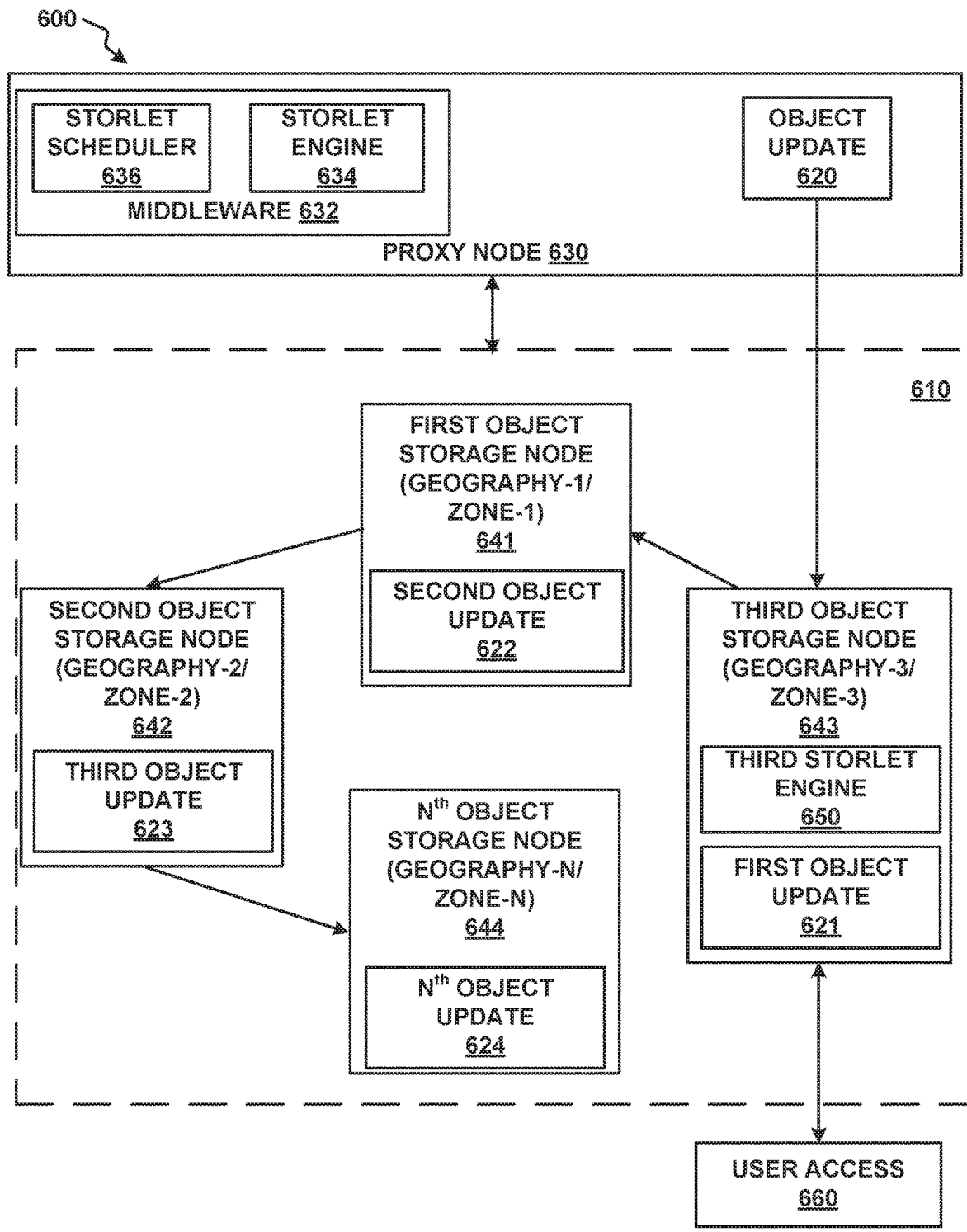
FIG. 6 depicts an object storage environment where an object is updated on one or more storage nodes according to a node processing activity correspondence with object application category priority scheme using a middleware, according to various embodiments of the present disclosure.

FIG. 6 depicts an object storage environment where an object is updated on one or more storage nodes according to a node processing activity correspondence with object application category priority scheme using novel middleware, according to embodiments. The object storage environment 600 may include a proxy node 630 connected to an object storage system 610. The storage environment 600 may be similar to the object storage environment 500 (of FIG. 5) but the object storage environment 600 includes a middleware 632 within the proxy node 630. The middleware 632 may include a storlet engine 634 and a storlet scheduler 636. The proxy node 630 may receive an update to an object stored (or a new object to be stored) on one or more of the object storage nodes 641-644 of the object storage system 610. The proxy node 630 and the object storage system 610 may be one or more instances of computer system/servers 10 (of FIG. 1).

The object storage system 610 may include one or more object storage nodes 641-644. The one or more object storage nodes 641-644 may include a first object storage node 641, a second object storage node 642, a third object storage node 643, and one or more additional object storage nodes illustrated as an $N^{th}$ object storage node 644. The first object storage node may be located in a first geography/zone (geography-1/zone-1). The second object storage node 642 may be located in a second geography/zone (geography-2/zone-2). The third object storage node 643 may be located in a third geography/zone (geography-3/zone-3). The $N^{th}$ object 544 storage node having one or more additional object storage nodes as the $N^{th}$ object storage node 644 which may be located in one or more additional geographies/zones as the $N^{th}$ geography/zone (geography-N/zone-N). In an example, the $N^{th}$ object storage node 644 may include six additional object storage nodes each with their own geographies/zones. The middleware 632, including the storlet engine 634 and the storlet scheduler 636, may be used to determine a first node for receiving an initial update (e.g., a first object update 621) of the data object 620 to be replicated. The storlet engine 634 may determine an application category of the data object 620 to determine a storage node with a first priority, e.g., to be updated first (or a priority list of the one or more storage nodes) of the object storage system 610 to be updated. The object storage nodes may be analyzed by the storlet scheduler 636 to determine processing activities associated with each of the nodes. The storlet scheduler 636 may determine and instruct the storlet engine 634 as to which node may have a first priority based on the application category of the object to be updated and the processing activity associated with the storage node.

The storlet scheduler 636 may determine that a first processing activity corresponds with the application category of the data object. The storlet scheduler 636 may determine that a first storage node is associated with the first processing activity. The storlet scheduler 636 may then select the first storage node based on the first storage node being associated with the first processing activity and the data object having an application category corresponding with the first processing activity. The selected first storage node may then be updated first, e.g., before other storage nodes that are not associated with the first processing activity or before other storage nodes that are not in the same geographic location as the geographic location of the first storage node. A storage node that is given the first priority may be updated with the first object update 621 before other nodes (e.g., a first object update 621 of the third object storage node 643). In an example, the storlet engine 634 may determine that the application category of the data object is an image. The storlet engine 634 may request (or store) the processing activities of each of the nodes from the storlet scheduler 636 and may be informed that the third storage node 643 is an image content management storage node. The first object update 621 may then be issued to the third object storage node 643.

Illustrated for example in the object storage environment 600, a user 660 may access the third object storage node 643. The user may require the update to the object 620 to perform an application transaction. The proxy node 630 may prepare the object update 620 and the middleware 632, including the storlet scheduler 636 and the storlet engine 634, may determine that the third object storage node 643 is a node to first receive the object update 620 (as a first object update 621 for the replication process), e.g., before the nodes in zones 1, 2, and N. After the first object update is complete, the proxy node 630 may then, in some embodiments, send the object update 620 to the third object storage node 643 as the first object update 621. The middleware 632 may then determine that the first object storage node 641 requires the object update 620 second.

The third object storage 643 node may send the update to the first object storage node as the second object update 622, e.g., after zone 3 but before zones 2 and N. The middleware 632 may determine that the second object storage node 642 requires the object update 620 third. The second object storage node 642 may receive the object update 620 as the third object update 623, e.g., after zones 3 and 2 but before zone N. The middleware 632 may determine that the $N^{th}$ object storage node 644 requires the object update 620 next. The one or more $N^{th}$ object storage node(s) 644 may receive the object update 620 as one or more $N^{th}$ object update(s) 624. By replicating the third object storage node 643 first based on an application category of a data object corresponding with a processing activity at the third storage node, or based on a determination that a processing activity at the first storage node depends on performance of a processing activity at the third storage node, the user 660 may receive the object update 620 as the first object update 621 and an application transaction submitted by the user may not time out (or provide poor results at various nodes). In the example of FIG. 6, storage nodes updated subsequent to the third storage node were updated in a particular order. The particular order may be based on a priority list, which may be determined in various ways as described below.

In various embodiments, the one or more object storage nodes may include a middleware or storlet engine. Storlet engines within the object storage nodes may be invoked to pull the update to the object storage node. In various embodiments, a middleware component on a proxy node may determine that an object storage node includes a storlet. In response to determining that the object storage node includes a storlet, a middleware component may cause a command to be sent to the storlet to pull the update to the storage node. Illustrated in FIG. 6 the third object storage node 643 may include a third storlet engine 650. The third storlet engine 650 of the third object storage node may pull the object update 620 as the first object update 621 to the third object storage node. The storlet engine 634 within the middleware 632 of the proxy node 630 may invoke the third storlet engine 650 to pull the object update 620 from the proxy node as the first object update 621. For example, an object update of image rendering may enter the proxy node. A storlet scheduler of the middleware of the proxy node may determine that the third object storage node has a first priority of the object update. The storlet engine of the proxy node may then invoke the third storlet engine of the third object storage node to pull the object update as the first object update.

In various embodiments, the storlet scheduler 636 may also develop a priority list of the one or more storage nodes 641-644, wherein the object update 620 may proceed sequentially through the list from a storage node with the highest priority (first object update 621) to a storage node with the lowest priority ($N^{th}$ object update 624). In various embodiments, priority may be based on a determination that a processing activity a one storage nodes depends on performance of a processing activity at another storage node. In various embodiments, priority may be based on a determination that an application category of a data object corresponds with a processing activity at a storage node. In some circumstances, the application category of a data object may correspond with a processing activity at two or more storage node. Where there is a corresponding processing activity at two storage nodes, the node to be updated first may be selected based on proximity, e.g., network distance, to the node transmitting the update, whether a user has current or pending transaction directed to one of the two nodes, or historical data with regard to timing or quantity of transactions directed by users to one of the two nodes.

As one example, a data object may correspond with a processing activity at first and second storage nodes. The first node may be in a first time zone and the second node may be in a second time zone. In this case, at the time of the update it may be determined which storage node historically experiences the most transaction activity at an update time. The first node may have the most transaction activity because at the time of the update it is in the middle of the workday in the first time zone. The second node may have the low transaction activity because at the time of the update it is in the middle of the night in the second time zone. Because the first node is determined to have the most transaction activity, it is updated first and the second node is updated second.

As another example, a data object may correspond with a processing activity at a first node and the first node is associated with the processing activity in a first proportion and the processing activity is associated with a second storage node in a second proportion, e.g. 60% of a particular processing activity may be directed the first node, while 10% of the particular processing activity may be directed the second node. Because the first proportion is greater than the second proportion, the first node may be updated before the second node. In various embodiments, the second proportion may be zero, wherein the second node may receive the update following the first node even though the second node may not utilize the update in daily operations. In some embodiments, a storage node that performs 0% of the processing activity may be considered to be not associated with the processing activity.

The storlet scheduler may receive (or store) a processing activity from each of the object storage nodes within the object storage system. Upon receipt of an object to be updated 620, a storlet engine 634 may analyze the object for the application category of the object. The storlet engine 634 may then compare the application category of the object to the processing activities of the object storage nodes 641-644 hosted on the storlet scheduler 636 and the storlet scheduler may develop a priority list of the one or more object storage nodes. The object storage nodes may then be updated based on the priority list such that an object storage node with the first priority may be updated first followed by an object storage node with a second priority, and so on. For example, the storlet scheduler may determine the processing activities for three object storage nodes including a first document content management storage node, a second video content management storage node, and a third image content management storage node.

An object may be received by the storlet engine and determined to be an application update, e.g., executable instructions, for updating an image quality. The storlet scheduler may then prioritize the nodes with the third object (image content management) storage node being updated as the first priority, followed by the second (video content management) object storage node as the second priority, then the first (document content management) object storage node as the third priority.

Figure 7:
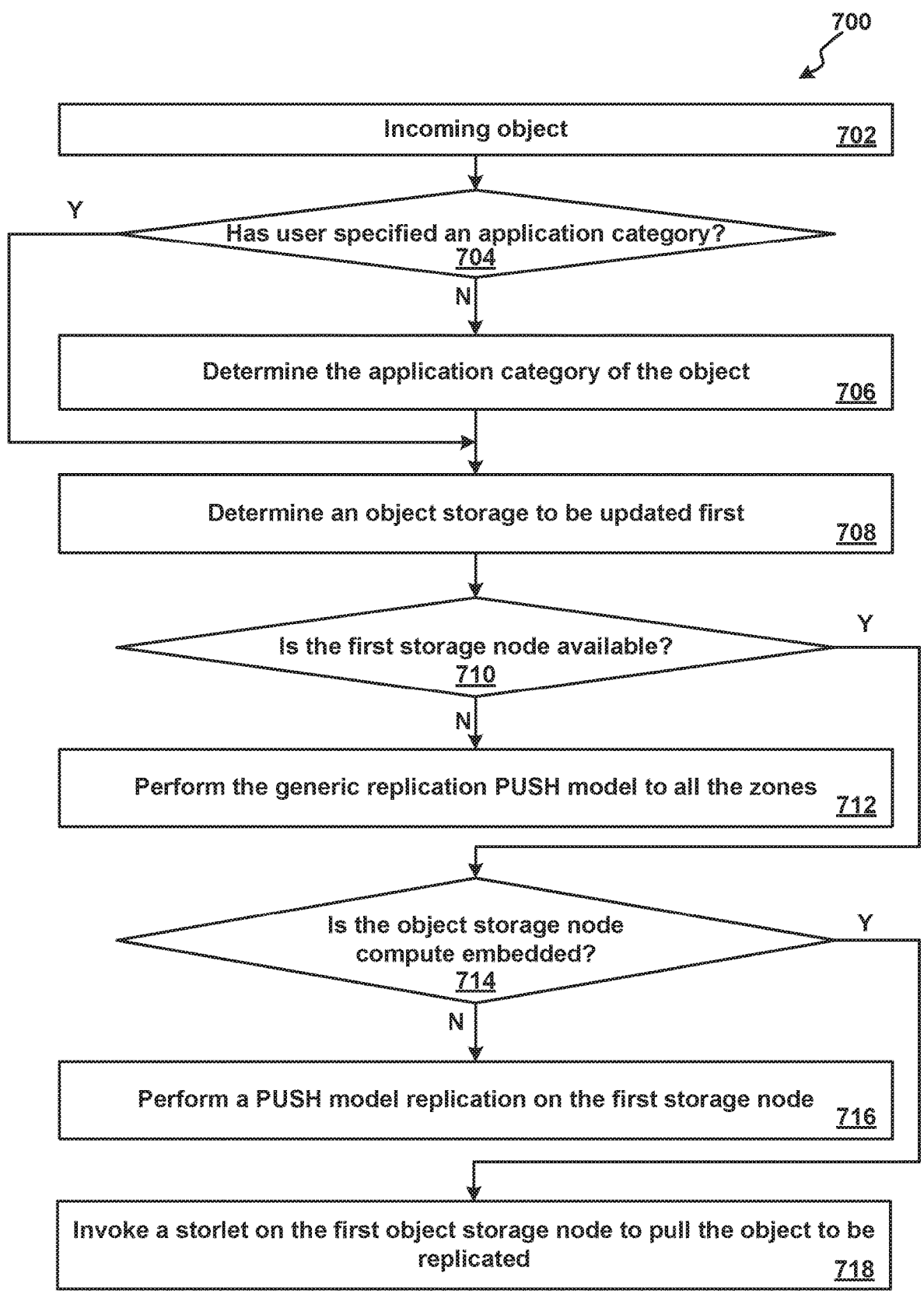
FIG. 7 depicts a flowchart for selecting a preferred node for replicating an object based on a node processing activity correspondence with object application category priority scheme, according to various embodiments of the present disclosure.

FIG. 7 depicts a flowchart of a method 700 for selecting a preferred node for replicating the object, according to embodiments. The method 700 may be used to identify a storage node of one or more storage nodes (e.g. object storage nodes 641-644 of FIG. 6) within an object storage system (e.g., object storage system 610 of FIG. 6) that has a first priority of a "new" incoming object (or update to a previous object) based on an application category of the incoming object (e.g., object update 620 of FIG. 6) and respective processing activities at various storage nodes. The first priority of the storage node, e.g., the node to be updated first, may be determined from the processing activities of the storage node. For example, if a processing activity of a first storage node of the object storage system matches the activity category of the incoming object, then the first storage node may receive a first priority for the update of the incoming object.

In operation 702, an object is introduced to the object storage environment as an incoming object. A new object (or update to a previous object) may be received by a proxy node of the object storage environment. A user may input the object into the object storage environment and a load balancer may distribute the object to the proxy node. The proxy node may receive the incoming object and prepare the object to be updated to one or more storage nodes of an object storage system within the object storage environment.

In decision block 704, a determination is made if a user has specified an application category of the object. During a submission of an object, the user may specify an application category for the object. For example, a user may submit an application category of image management. If the user submits an application category for the object, then the method 700 may progress to operation 708. If the user does not submit an application category for the object, then the method 700 may progress to operation 706.

In operation 706, an application category of the object is determined. The object may include metadata (or attributes) of the object. The metadata of the object may be analyzed by a storlet engine to determine the application category of the object. For example, an object may include metadata that when analyzed by the storlet engine categorizes the object as an image adjustment application. The storlet engine may then set the application category of the object as an image application category.

In operation 708, an object storage node with a first priority, e.g., a node to be updated first, is determined from the one or more object storage nodes. The middleware may include a storlet scheduler, which may gather applications being utilized within each of the one or more object storage nodes of the object storage environment. In addition, the middleware may determine the type and amount of processing activities directed to each storage node. For example, each object storage node may include the full application, i.e., all application components, of the object storage environment, but the first node may be mostly utilized for application components for a particular processing activity, e.g., image alterations, whereas a second node may be mostly utilized for a data management application component. The middleware may determine portions or percentages of transactions directed to a particular processing activity at each node. In one embodiment, the middleware may determine a percentage of processing activity at a node based on historical data. The storlet scheduler may then set one or more processing activities for each of two or more nodes. In addition, the storlet scheduler 636 may set the portion of transactions or a particular processing activity that occur at each node. In some embodiments, the portion may be the portion of transactions for a processing activity of system wide. In other embodiments, the portion may be the portion of transactions for a processing activity of at a node. For example, a first node may be assigned an image processing activity, and the second node may be assigned a data management processing activity. The first assignment may be based on the first node historically experiencing eighty percent of system wide transactions related to the image processing activity. The second assignment may be based on the second node historically experiencing fifty-five percent of system wide transactions related to the data management processing activity. The storlet engine may then determine an object storage node with a first priority, e.g., to be updated first, by matching the application category of the incoming object to an object storage node that is associated with a first processing activity which corresponds with the application category. In various embodiments, an object storage node that is associated with the first processing activity to a greatest proportion is selected. For example, if the object has an image application category and a first node has an image processing activity, and the percentage of transactions related to image processing activity at the first node is the greatest in the system, then the first node may have a first priority, e.g., to be updated first, for the incoming object update.

In various embodiments, the storlet scheduler 636 of the proxy node may create a priority list of the object storage nodes to receive the object from the proxy node. The storlet scheduler may compare the processing activities of all of the object storage nodes to the application category of the object. The comparison may rank the object storage nodes from the first object storage node (with a first priority) to the $N^{th}$ object storage node (with a last priority). In some embodiments, the nodes may be ranked based on the percentages of transactions related to the particular processing activity that are handled at the respective nodes. For example, the node with the highest percentage of transactions would be selected to receive the first update and the node with second highest percentage of transactions would be selected to receive the second update. In other embodiments, the nodes may be ranked based on dependencies between processing activities at different nodes. In still other embodiments, the nodes may be ranked based on a combination of the percentages of transactions related to the particular processing activity that are handled at the respective nodes and dependencies between processing activities at different nodes. Upon the completion of the replication of the object to the first object storage node, the object may be passed to a next object storage node with a second priority, which may be updated and so on until the $N^{th}$ object storage node is updated.

In decision block 710, a determination is made if the first storage node (or priority node) is available to receive the object. One or more factors of the first storage node may cause the first storage node to be unable to receive the object from the proxy node. For example, the first storage node may have a workload greater than a threshold (e.g., not having enough available processing power), causing the first storage node to be unable to process (or update) the object. If the first storage node is not available, then the method 700 may progress to operation 712. If the first storage node is available, then the method 700 may progress to operation 714.

In operation 712, a generic replication PUSH model may be performed on the object storage environment. If the first storage node (i.e., the storage node with the first priority of the incoming object) is unavailable (or nonexistent), then the one or more object storage nodes of the object storage environment may be updated.

In decision block 714, a determination is made if the object storage node is compute embedded. A compute embedded storage node may include a middleware within the object storage node. The middleware may contain a storlet, which may perform functions on objects within the object storage node and within the object storage environment. If the first storage node is not compute embedded, then the method 700 may progress to operation 716. If the first storage node is compute embedded, then the method 700 may progress to operation 718.

In operation 716, the replication of the object is performed such that each of the object storage nodes of the one or more object storage nodes are updated with a PUSH model. Since the object storage node is not compute embedded, the object storage node may not be configured to pull the object from the proxy node. The proxy node may transmit the object to be replicated to the first storage node (priority node) by a PUSH model which may send the object to the first storage node, which may receive and install (or update) the object on the first object storage node. One or more object storage nodes may then be replicated from the first object update of the first object storage node. The update of the one or more additional storage nodes may be determined based on priority (e.g., returning to operation 708 and determining an object storage node with a second priority), or updated based on the geography (zone) of the object in respect to a first geography of the first object storage node.

In operation 718, the replication of the object is performed such that a storlet of the first storage node is invoked to pull the object onto the first object storage node. The first object storage node may be compute embedded and may include a storlet. The proxy node containing the new object (or updated object) may invoke the storlet of the first object storage node, e.g., causing a command to be transmitted to the storlet, to pull the object as the first update. The update of the one or more additional storage nodes may be determined based on priority (e.g., returning to operation 708 and determining an object storage node with a second priority), or updated based on the geography (zone) of the object in respect to a first geography of the first object storage node.

In various embodiments, the storlet enabled first object storage node may determine a second priority object storage node to next receive the new (or updated) object. The one or more remaining object storage nodes may be determined for a second priority to receive the object, e.g., to receive the next subsequent object update after the first update. The method may return to operation 708 where the first object storage node may determine a second object storage node to next receive an update (e.g., a second priority). The first object storage node may then select a second object storage node with the second priority, and invoke the second object storage node to pull the object and install (or update) the object on the second object storage node.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via input/output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
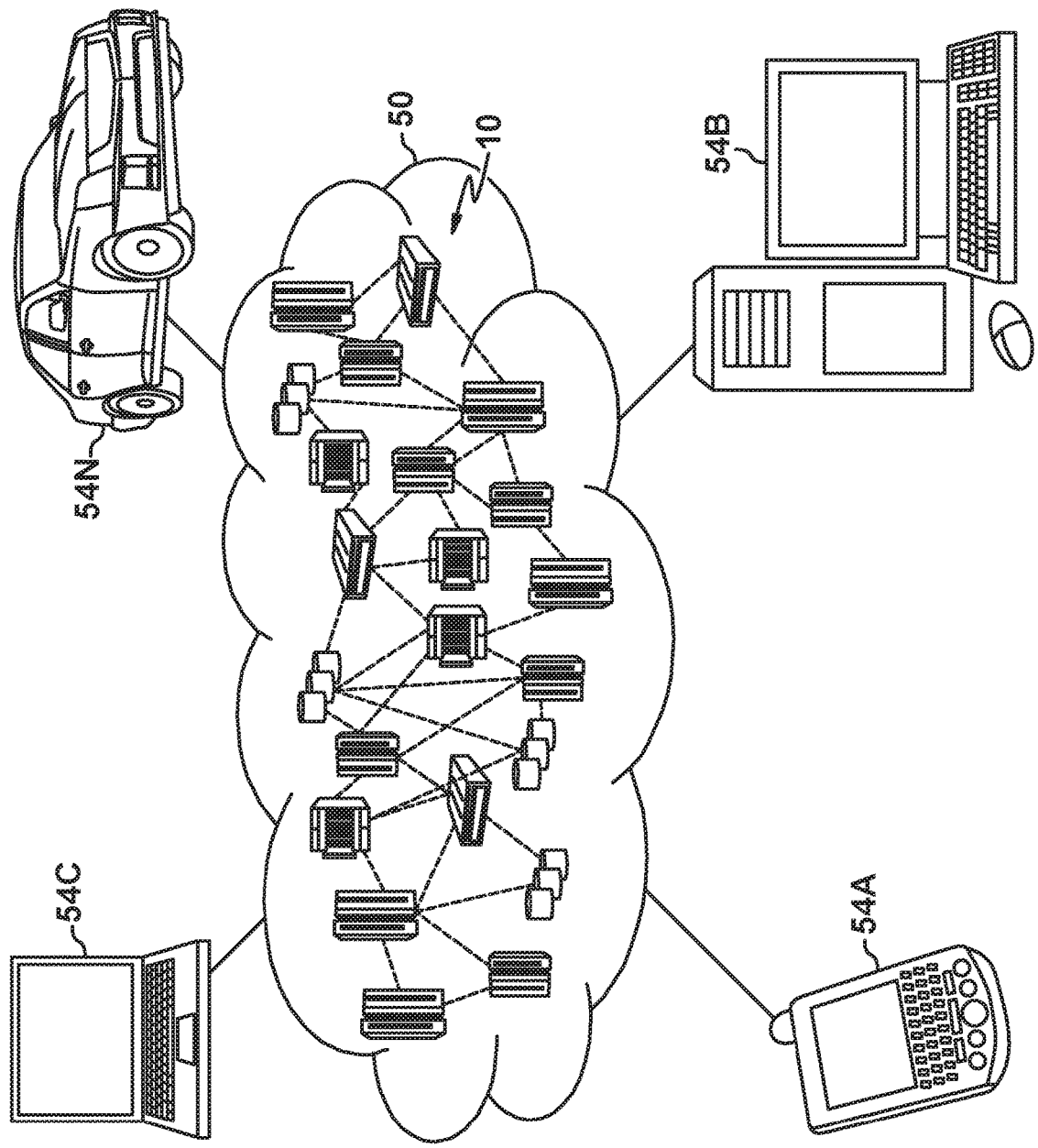
FIG. 2 depicts a cloud computing environment, according to various embodiments of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 may communicate with any type of computerized device over any type of network and/or network addressable connection (e.g., using a web browser).

Figure 3:
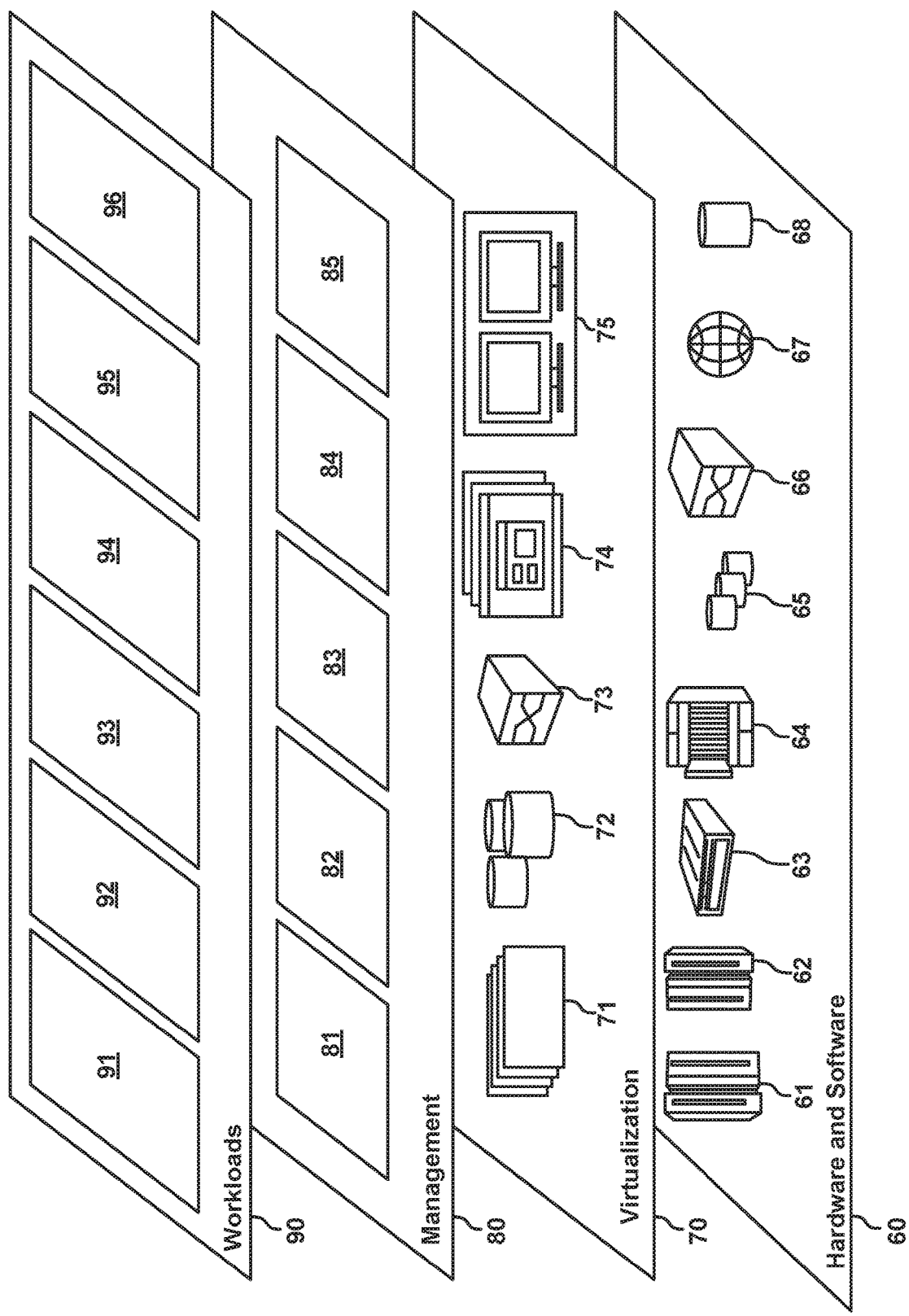
FIG. 3 depicts abstraction model layers, according to various embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96. The mapping and navigation 91 of the workload layer 90 may include a middleware including a storlet for determining an optimal node for processing a computational algorithm.

The present disclosure may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for updating a copy of a data object stored on a storage node, the method being performed by a processor executing a middleware at a proxy node, the method comprising:
    determining an application category for the data object, wherein a plurality of copies of the data object are stored on a respective plurality of storage nodes, wherein the plurality of storage nodes perform heterogeneous processing activities, wherein a first subset of the plurality of storage nodes are dependent on a workflow of a second subset of the plurality of storage nodes, wherein one or more storage nodes of the plurality of storage nodes are located at a first geographic location, and one or more different storage nodes of the plurality of storage nodes are located at one or more geographic locations different from the first geographic location, wherein the application category is based on a metadata of the data object to be updated,
    determining a first processing activity that corresponds with the application category of the data object;
    selecting a first storage node of the plurality of storage nodes for updating a copy of the data object stored at the first storage node based on the first storage node being associated with the first processing activity in a first proportion and based on the application category of the data object;
    setting, responsive to the selection, a first priority for updating the copy of the data object before updating one or more copies of the data object at other storage nodes at a second priority, the first priority based on an adjacency of the first storage node to a first application running the first processing activity at a level above a middleware, and the first priority based on an adjacency of the first storage node to a second application running a second processing activity at a level above the middleware, wherein the second application running the second processing activity is dependent on the first application in an application workflow;
    updating, based on the first priority, the copy of the data object; and
    determining whether the first storage node includes a storlet,
    wherein, in response to determining that the first storage node includes a storlet, the updating the copy of the data object stored at the first storage node includes transmitting a command to the storlet to pull an update for the data object to the first storage node,
    wherein, in response to determining that the first storage node does not include a storlet, the updating the copy of the data object stored at the first storage node includes transmitting the data object to the first storage node.

2. The method of claim 1, further comprising:
    determining that a third processing activity depends on the first processing activity; and
    updating a second copy of the data object stored at a third storage node after updating the first storage node, wherein the third processing activity is associated with the third storage node of the plurality of storage nodes.

3. The method of claim 2, wherein the third storage node is in a third geographic location different from the first geographic location.

4. The method of claim 1, wherein the determining an application category for the data object includes receiving an interactive user input specifying the application category.

5. The method of claim 1, wherein the first storage node is in the first geographic location and the second storage node is in a second storage location different from the first geographic location.

6. A system for updating a copy of a data object stored on a storage node, comprising:
    a proxy node having a processor and a memory, the memory storing a middleware, the middleware including instructions executable by the processor to cause the processor to:
        determine an application category for the data object, wherein a plurality of copies of the data object are stored on a respective plurality of online storage nodes, wherein the plurality of online storage nodes perform heterogeneous processing activities, wherein one or more online storage nodes of the plurality of online storage nodes are located at a first geographic location, wherein a first subset of the plurality of online storage nodes are dependent on a workflow of a second subset of the plurality of online storage nodes, and one or more different online storage nodes of the plurality of online storage nodes are located at one or more geographic locations different from the first geographic location, wherein the application category is based on a metadata of the data object to be updated, determine a first processing activity that corresponds with the application category of the data object;

select a first online storage node of the plurality of online storage nodes for updating a copy of the data object stored at the first online storage node based on the first online storage node being associated with the first processing activity in a first proportion and based on the application category of the data object;

set, responsive to the selection, a first priority for updating the copy of the data object before updating one or more copies of the data object at other storage nodes at a second priority, the first priority based on an adjacency of the first online storage node to a first application running the first processing activity at a level above a middleware, and the first priority based on an adjacency of the first online storage node to a second application running a second processing activity at a level above the middleware, wherein the second application running the second processing activity is dependent on the first application in an application workflow;

update the copy of the data object stored at the first online storage node before updating a second copy of the data object stored at a second online storage node, wherein the second online storage node is associated with the first processing activity in a second proportion, the second proportion being less than the first proportion; and determine whether the first online storage node includes a storlet, wherein, in response to determining that the first online storage node includes a storlet, the updating the copy of the data object stored at the first online storage node includes transmitting a command to the storlet to pull an update for the data object to the first online storage node, wherein, in response to determining that the first online storage node does not include a storlet, the updating the copy of the data object stored at the first online storage node includes transmitting the data object to the first online storage node.

7. The system of claim 6, wherein the middleware including instructions executable by the processor further cause the processor to:

determine that a third processing activity depends on the first processing activity; and update a second copy of the data object stored at a third online storage node after updating the first online storage node, wherein the third processing activity is associated with the third online storage node of the plurality of online storage nodes, and the third online storage node is in a second geographic location different from the geographic location of the first online storage node.

8. The system of claim 6, wherein the middleware including instructions executable by the processor further cause the processor to:

receive an interactive user input specifying the application category.

9. The system of claim 6, wherein the second online storage node and the proxy node are in a same geographic region.

10. The system of claim 6, wherein the proxy node is a distinct node from the first and second online storage nodes.

11. A computer program product for updating a copy of a data object stored on a storage node, the computer program product comprising a computer readable storage medium having program instructions stored thereon, the program instructions executable by a processor to cause the processor to:

determine an application category for the data object, wherein a plurality of copies of the data object are stored on a respective plurality of storage nodes, wherein the plurality of storage nodes perform heterogeneous processing activities, wherein a first subset of the plurality of storage nodes are dependent on a workflow of a second subset of the plurality of storage nodes, wherein one or more storage nodes of the plurality of storage nodes are located at a first geographic location, and one or more different storage nodes of the plurality of storage nodes are located at one or more geographic locations different from the first geographic location, wherein the application category is based on a metadata of the data object to be updated, determine a first processing activity that corresponds with the application category of the data object;

select a first storage node of the plurality of storage nodes for updating a copy of the data object stored at the first storage node based on the first storage node being associated with the first processing activity in a first proportion and based on the application category of the data object;

set, responsive to the selection, a first priority for updating the copy of the data object before updating other storage nodes at a second priority, the first priority based on an adjacency of the first storage node to a first application running the first processing activity at a level above a middleware, and the first priority based on an adjacency of the first storage node to a second application running a second processing activity at a level above the middleware, wherein the second application running the second processing activity is dependent on the first application in an application workflow;

update, based on the first priority, the copy of the data object before updating a second copy of the data object stored at a second online storage node, wherein the second online storage node is associated with the first processing activity in a second proportion, the second proportion being less than the first proportion; and determine whether the first storage node includes a storlet, wherein, in response to determining that the first storage node includes a storlet, the updating the copy of the data object stored at the first storage node includes transmitting a command to the storlet to pull an update for the data object to the first storage node, wherein, in response to determining that the first storage node does not include a storlet, the updating the copy of the data object stored at the first storage node includes transmitting the data object to the first storage node.

12. The program product of claim 11, wherein the program instructions executable by a processor further cause the processor to:

determine that a third processing activity depends on the first processing activity; and update a second copy of the data object stored at a third storage node after updating the first storage node, wherein the third processing activity is associated with the third storage node of the plurality of storage nodes, and the third storage node is in a second geographic location different from the geographic location of the first storage node.

13. The program product of claim 11, wherein the program instructions executable by a processor further cause the processor to:
   receive an interactive user input specifying the application category.

14. The program product of claim 11, wherein the second storage node and the proxy node are in a same geographic region.

* * * * *